United States Patent
Hu et al.

(10) Patent No.: US 10,624,062 B2
(45) Date of Patent: Apr. 14, 2020

(54) DEVICES AND METHODS FOR NETWORK-ASSISTED D2D COMMUNICATIONS BY DEVICES OPERATING IN AN AD HOC MODE OR A NETWORK-ASSISTED MODE

(71) Applicant: Huawei Technologies Co., Ltd., Shenzhen (CN)

(72) Inventors: Liang Hu, Shenzhen (CN); Chan Zhou, Munich (DE); Markus Martin Dillinger, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 100 days.

(21) Appl. No.: 15/862,953

(22) Filed: Jan. 5, 2018

(65) Prior Publication Data
US 2018/0146453 A1   May 24, 2018

Related U.S. Application Data

(63) Continuation of application No. PCT/EP2015/065373, filed on Jul. 6, 2015.

(51) Int. Cl.
*H04W 72/00* (2009.01)
*H04W 72/02* (2009.01)
(Continued)

(52) U.S. Cl.
CPC ......... *H04W 72/005* (2013.01); *H04W 72/02* (2013.01); *H04W 72/042* (2013.01); *H04W 84/18* (2013.01); *H04W 88/06* (2013.01)

(58) Field of Classification Search
CPC . H04W 72/005; H04W 72/042; H04W 72/02; H04W 88/06; H04W 84/18
See application file for complete search history.

(56) References Cited

U.S. PATENT DOCUMENTS

| 2010/0008235 A1* | 1/2010 | Tinnakornsrisuphap ................... H04L 29/12264 370/241 |
| 2011/0082939 A1* | 4/2011 | Montemurro ......... H04W 76/14 709/227 |

(Continued)

FOREIGN PATENT DOCUMENTS

| CN | 102246575 A | 11/2011 |
| CN | 104519577 A | 4/2015 |

(Continued)

OTHER PUBLICATIONS

Ericsson, "On Scheduling Assignments and Receiver Behaviour," 3GPP TSG-RAN WG1 Meeting #76bis, R1-141391, Shenzhen, China, Mar. 31-Apr. 4, 2014, 6 pages.

(Continued)

*Primary Examiner* — Tejis Daya
(74) *Attorney, Agent, or Firm* — Slater Matsil, LLP

(57) ABSTRACT

The application relates to devices and methods for network-assisted D2D communication. A communication device is configured to select a data channel communication resource from a plurality of data channel communication resources which are reserved for D2D data channel communications. The communication device is configured to select an ad-hoc mode control channel resource from a plurality of ad-hoc mode control channel resources which are reserved for D2D ad-hoc mode control channel communications. The communication device is further configured to broadcast, using the selected ad-hoc mode control channel resource, a communication resource selection message including information about the selected data channel communication resource to the plurality of communication devices. The communication device is further configured to communicate with at least (Continued)

one of the plurality of communication devices using the selected data channel communication resource.

12 Claims, 12 Drawing Sheets

(51) Int. Cl.
*H04W 72/04* (2009.01)
*H04W 84/18* (2009.01)
*H04W 88/06* (2009.01)

(56) References Cited

U.S. PATENT DOCUMENTS

| | | | | |
|---|---|---|---|---|
| 2011/0188485 | A1* | 8/2011 | Fodor | H04W 76/14 370/338 |
| 2012/0093098 | A1 | 4/2012 | Charbit et al. | |
| 2013/0102314 | A1* | 4/2013 | Koskela | H04W 36/0072 455/436 |
| 2014/0094183 | A1 | 4/2014 | Gao et al. | |
| 2014/0133332 | A1* | 5/2014 | Lee | H04W 88/04 370/252 |
| 2014/0199969 | A1 | 7/2014 | Johnsson et al. | |
| 2014/0204847 | A1 | 7/2014 | Belleschi et al. | |
| 2014/0256334 | A1* | 9/2014 | Kazmi | H04W 28/18 455/450 |
| 2015/0009910 | A1* | 1/2015 | Ryu | H04W 72/04 370/329 |
| 2015/0036495 | A1* | 2/2015 | Venkatachalam | H04W 4/70 370/235 |
| 2015/0049732 | A1* | 2/2015 | Xue | H04L 1/1854 370/330 |
| 2015/0085765 | A1* | 3/2015 | Tavildar | H04L 5/0073 370/329 |
| 2015/0249937 | A1* | 9/2015 | Lindoff | H04W 36/0011 370/331 |
| 2015/0282142 | A1* | 10/2015 | Dahlman | H04W 84/20 370/329 |
| 2015/0327311 | A1* | 11/2015 | Wei | H04L 12/6418 370/329 |
| 2016/0066337 | A1* | 3/2016 | Sartori | H04W 76/14 370/329 |
| 2016/0135143 | A1* | 5/2016 | Won | H04W 72/005 370/312 |
| 2016/0135201 | A1* | 5/2016 | Brahmi | H04L 5/006 370/329 |
| 2016/0255647 | A1* | 9/2016 | Zhu | H04W 72/1278 370/329 |
| 2017/0013497 | A1* | 1/2017 | Lee | H04L 67/12 |
| 2017/0048829 | A1* | 2/2017 | Kim | H04W 72/042 |
| 2017/0251486 | A1 | 8/2017 | Hu et al. | |

FOREIGN PATENT DOCUMENTS

| | | |
|---|---|---|
| EP | 2665325 A1 | 11/2013 |
| WO | 2014047907 A1 | 4/2014 |
| WO | 2014054990 A1 | 4/2014 |
| WO | 2014062035 A1 | 4/2014 |
| WO | 2015047167 A1 | 4/2015 |

OTHER PUBLICATIONS

Huawei et al., "Distributed resource allocation from mode-2," 3GPP TSG RAN WG1 Meeting #77, R1-141929, Seoul, Korea, May 19-23, 2014, 4 pages.

ZTE, "Distributed Resource Allocation for D2D Communication," 3GPP TSG-RAN WG1 Meeting #76bis, R1-141425, Shenzhen, China, Mar. 31-Apr. 4, 2014, 5 pages.

Alcatel-Lucent et al, "Mode 2 transmission UE for D2D communication," 3GPP TSG-RAN WG2 Meeting #85bis, R2-141659, Valencia, Spain, Mar. 31-Apr. 4, 2014, 4 pages.

Ericsson, "On Procedures for In/Out of NW coverage detection for D2D," 3GPP TSG RAN WG1 Meeting #76, R1-140780, Prague, CZ Rep., Feb. 10-14, 2013, 5 pages.

Interdigital Communications, "Mode Selection and Resource Pool Selection for D2D UEs," 3GPP TSG-RAN WG2 #85bis, Tdoc R2-141695, Valencia, Spain, Mar. 31-Apr. 4, 2014, 5 pages.

Qualcomm Incorporated, "One-to-one ProSe Direct Communication considerations," SA WG2 Meeting #104, S2-142442, Dublin, Ireland, Jul. 7-11, 2014, 7 pages.

Choi, J. et al., "EBA: An Enhancement of the IEEE 802.11 DCF via Distributed Reservation," IEEE Transactions on Mobile Computing, vol. 4, No. 4, Jul./Aug. 2005, pp. 378-390.

Huawei et al., "Resource allocation for UE-to-Network relay," 3GPP TSG RAN WG1 Meeting #80bis, R1-151279, Belgrade, Serbia, Apr. 20-24, 2015, 3 pages.

Intel Corporation, "Resource allocation signaling for D2D communication," 3GPP TSG RAN WG2 Meeting #85bis, R2-141223, Valencia, Spain, Mar. 31-Apr. 4, 2014 6 pages.

ZTE, "Resource allocation for relay UE and remote UE," 3GPP TSG-RAN WG2 #90, R2-152552, Fukuoka, Japan, May 25-29, 2015, 4 pages.

Fodor, G. et al., "Design Aspects of Network Assisted Device-to-Device Communications," IEEE Communications Magazine, Accepted from Open Call, vol. 50, Issue: 3, Mar. 2012, pp. 170-177.

Doppler, K. et al., "Device-to-Device Communication as an Underlay to LTE-Advanced Networks," IEEE Communications Magazine, Topics in Radio Communications, Dec. 2009, pp. 42-49.

3rd Generation Partnership Project;Technical Specification Group Radio Access Network; Study on LTE Device to Device Proximity Services; Radio Aspects (Release 12), 3GPP TR 36.843 V12.0.1 (Mar. 2014) Technical Report, 50 pages.

Jiang, D. et al., "IEEE 802.11 p: Towards an international Standard for Wireless Access in Vehicular Environments," IEEE Vehicular Technology Conference (VTC), May 11-14, 2008, pp. 2036-2040.

Mangel, T., "A Comparison of UMTS and LTE for Vehicular Safety Communication at Intersections," IEEE Vehicular Networking Conference (VNC), Dec. 13-15, 2010, pp. 293-300.

ETSI, "Intelligent Transport Systems (ITS); Vehicular Communications; Basic Set of Applications; Part 2: Specification of Cooperative Awareness Basic Service," ETSI TS 102 637-2 V1.2.1 (Mar. 2011), 18 pages.

Kim, S-W. et al., "Multivehicle Cooperative Driving Using Cooperative Perception: Design and Experimental Validation," IEEE Transactions on Intelligent Transportation Systems, vol. 16, No. 2, Apr. 2015, pp. 663-680.

Gomes, P., et al., "The See-Through System: From Implementation to Test-Drive," IEEE Vehicular Networking Conference (VNC), Nov. 2012, pp. 40-47.

IEEE Std 802.11p-2010, IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 6: Wireless Access in Vehicular Environments, IEEE Computer Society, Jul. 15, 2010, 51 pages.

* cited by examiner

DEVICES AND METHODS FOR NETWORK-ASSISTED D2D COMMUNICATIONS BY DEVICES OPERATING IN AN AD HOC MODE OR A NETWORK-ASSISTED MODE

CROSS-REFERENCE TO RELATED APPLICATIONS

This application is a continuation of International Application No. PCT/EP2015/065373, filed on Jul. 6, 2015, the disclosure of which is hereby incorporated by reference in its entirety.

TECHNICAL FIELD

The present application relates to devices and methods for device-to-device (D2D) communication. More specifically, the present application relates to devices and methods for D2D communication assisted by a cellular network, i.e. network-assisted D2D communication.

BACKGROUND

In communication networks, communication resources used for communication, such as time slots, frequency channels, resource blocks and the like, usually have to be shared by a plurality of communication devices. In order to coordinate an access of the plurality of communication devices to the communication resources, medium access control (MAC) mechanisms can be applied. Common mechanisms for medium access control (MAC) are, for instance, carrier sense multiple access with collision avoidance (CSMA/CA) or carrier sense multiple access with collision detection (CSMA/CD). Data to be communicated can be embedded in a frame structure adapted to the chosen medium access control (MAC) mechanism.

In CSMA/CA, a carrier sensing scheme is used. In the carrier sensing scheme of CSMA/CA, the plurality of communication devices can attempt to avoid collisions by transmitting only when the communication resource is sensed to be idle. In CSMA/CD, another carrier sensing scheme is used. In the carrier sensing scheme of CSMA/CD, a device can detect collisions while transmitting data, can stop transmitting the data, and can wait for a time interval before resending the data.

Newly emerging applications, such as vehicle-to-X (V2X) communications using device-to-device (D2D) communications, can pose challenges with regard to providing a low latency and a high reliability within a communication network. Moreover, data having different priorities may have to be communicated within the communication network. Conventional medium access control (MAC) mechanisms in conjunction with conventional frame structures, however, are usually not capable of providing these functionalities concurrently and can suffer from a lack of flexibility and scalability.

In G. Fodor et al., "Design Aspects of Network-assisted Device-to-Device Communications", IEEE Communications Magazine, May 2011, a D2D communication network is described.

SUMMARY

It is an object of the application to provide a concept to improve the effectiveness and efficiency of a communication network.

This object may be achieved by the respective subject-matter of the independent claims. Further implementation forms are apparent from the dependent claims, the description and the figures.

According to a first aspect, the application relates to a communication device configured to operate in an ad-hoc communication mode for communicating with a plurality of other communication devices. The communication device is configured to select a data channel communication resource from a plurality of data channel communication resources. The plurality of data channel communication resources can be reserved for D2D data channel communications. The communication device is configured to select an ad-hoc mode control channel resource from a plurality of ad-hoc mode control channel resources. The plurality of ad-hoc mode control channel resources can be reserved for D2D ad-hoc mode control channel communications. The communication device is further configured to broadcast, using the selected ad-hoc mode control channel resource, a communication resource selection message including information about the selected data channel communication resource to the plurality of communication devices. The communication device is further configured to communicate with at least one of the plurality of communication devices using the selected data channel communication resource.

A communication device according to the first aspect of the application may provide for an efficient sharing of communication resources leading to fewer collisions of communication devices selecting interfering communication resources. Hence, the effectiveness and the efficiency of a communication network comprising such a communication device are improved.

It shall be mentioned that a communication device in the ad-hoc communication mode may be in the coverage range of a base station but does not have an active connection (e.g. a radio bearer) established to the base station. Hence, if the communication device is in the ad-hoc mode, it chooses its data channel resources for D2D communication on its own. In contrast, a communication device in the network-assisted communication mode has an active connection (e.g. a radio bearer) established to the base station. In such network-assisted mode, the communication device gets its data channel resources for D2D communication, and eventually for communication with the base station, allocated by the base station. Although there may be communication devices according to an embodiment which only support one of the mentioned two communication modes, further communication devices according to an embodiment can also be able to switch between these two communication modes.

In a first possible implementation form of the first aspect of the application, the communication device is further configured to receive a communication resource setup message from a base station. The communication resource setup message indicates the plurality of ad-hoc mode control channel resources. The communication device is further configured to select the ad-hoc mode control channel resources out of the indicated ad-hoc mode control channel resources. By selecting ad-hoc mode control channel communication resources on the basis of the communication resource setup message received from a base station, a more systematic selection of ad-hoc mode control channel communication resources can be achieved. Hence, the effectiveness and the efficiency of a communication network comprising such a communication device may be improved.

In a second possible implementation form of the first aspect of the application, or the first implementation form thereof, the communication device is configured to receive a communication resource setup message comprising information about a communication resource selection protocol. The communication device is further configured to select the data channel communication resource or the ad-hoc mode control channel communication resource on the basis of the communication resource selection protocol. By providing information about a communication resource selection protocol from the base station to the communication device, a more systematic selection of data channel and ad-hoc mode control channel communication resources can be achieved. Hence, the effectiveness and the efficiency of a communication network comprising such a communication device may be improved.

In a third possible implementation form of the first aspect of the application, or the first or second implementation form thereof, the communication device is further configured to receive a communication resource allocation message from a further communication device of the plurality of communication devices which is operated in an network-assisted communication mode. The communication resource allocation message includes information about at least a further data channel communication resource selected by the further communication device. The communication device is configured to select the data channel communication resource taking into account the further data channel resource selected by the further communication device. By monitoring the data channel communication resources selected by other communication devices, in particular neighboring communication devices operated in the network-assisted communication mode, and by selecting a further data channel communication resource on the basis thereof, an efficient sharing of data channel communication resources can be achieved leading to fewer collisions of communication devices selecting interfering data channel communication resources. Hence, the effectiveness and the efficiency of a communication network comprising such a communication device may be improved.

In a fourth possible implementation form of the third implementation form of the first aspect of the application, the communication device is configured to decode network-assisted mode control channel communication resources (reserved for the assisted mode control channel) to receive the communication resource allocation message. By enabling the communication device in the ad-hoc communication mode to also decode assisted mode control channel communication resources, it can be achieved data channel collisions between communications devices in the ad-hoc communication mode and communication devices in the network-assisted mode communication devices can be avoided or at least reduced. Hence, the effectiveness and the efficiency of a communication network comprising such a communication device may be improved.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

According to a second aspect, the application relates to a method of operating a communication device (such as the one described above) in an ad-hoc communication mode for communicating with a plurality of communication devices. The method comprises selecting a data channel communication resource from a plurality of data channel communication resources, which can be reserved for D2D data channel communications. The method also comprises selecting an ad-hoc mode control channel resource from a plurality of ad-hoc mode control channel resources, which can be reserved for D2D ad-hoc mode control channel communications. The method also comprises broadcasting, using the selected ad-hoc mode control channel resource, a communication resource selection message including information about the selected data channel communication resource to the plurality of communication devices, and communicating with at least one of the plurality of communication devices using the selected data channel communication resource.

According to a third aspect, the application relates to a communication device configured to operate in a network-assisted communication mode for communicating with a plurality of communication devices. The communication device is configured to receive a communication resource selection message broadcasted by at least one further communication device of the plurality of communication devices. The further communication device is operated in an ad-hoc communication mode, such as the communication device as described in conjunction with the first aspect. The communication resource selection message includes information about a data channel communication resource for D2D communication selected by the further communication device. The communication device is configured to forward the information about the data channel communication resource selected by the further communication device to a base station of the cellular communication network. The communication device is configured to receive a communication resource allocation message from the base station including information about a data channel communication resource allocated to the communication device. The communication device is configured to communicate with the plurality of communication devices using the allocated data channel communication resource.

A communication device according to the third aspect of the application provides for an efficient sharing of communication resources leading to fewer collisions of communication devices selecting interfering communication resources. By forwarding the information about the data channel resource selections performed by communication devices in the ad-hoc mode to the base station, the base station can perform its scheduling decisions (e.g. data channel resource allocations to communications devices in the network-assisted mode) based on this information. As such, data channel collisions between communication devices in the ad-hoc mode and in the network-assisted mode are avoided, or at least reduced. Hence, the effectiveness and the efficiency of a communication network comprising such a communication device may be improved.

In a first possible implementation form of the third aspect of the application, the communication device is configured to broadcast to the plurality of communication devices operated in ad-hoc or assisted mode a message indicating the data channel resource allocated to the communication device. By broadcasting the data channel communication resource(s) allocated to the communication device by the base station, the other communication devices (especially communication devices in the ad-hoc mode) within the neighborhood of the communication device on the basis of this information can select available data channel communication resources to avoid collisions with the data channel communication resources allocated to the communication device. Hence, the effectiveness and the efficiency of a communication network comprising such a communication device are improved.

In a second possible implementation form of the first implementation form of the third aspect of the application, the communication device is configured to broadcast the message indicating the data channel resource allocated to the communication device using an assisted mode control channel resource allocated by the base station and reserved for D2D assisted mode. By using an assisted mode control channel resource allocated by the base station for broadcasting the information about the data channel resource(s) allocated to the communication device, control channel resource collisions are less likely, and the broadcasted message indicating the data channel resource(s) allocated to the communication device can be processed more efficiently by the other communication devices, i.e. the recipients of the broadcast message, such as the communication devices in the ad-hoc communication mode. Hence, the effectiveness and the efficiency of a communication network comprising such a communication device may be improved.

In a third possible implementation form of the third aspect of the application, or the first or second implementation form thereof, the communication device is configured to forward the information about the communication resource selected by the further communication device to the base station as part of a request for allocating further communication resources, in particular cellular communication resources, for a communication between the base station and the communication device. By combining the information about the communication resource selected by the further communication device with a request for allocating further communication resources to the communication device, the signaling overhead can be reduced. Hence, the effectiveness and the efficiency of a communication network comprising such a communication device may be improved.

In a fourth possible implementation form of the third aspect of the application, or any one of the first to third implementation form thereof, the communication device is configured to switch from the network-assisted communication mode to the ad-hoc communication mode upon the release of a radio bearer between the base station and the communication device.

The communication device can be arranged within a vehicle or car, or can be carried by a pedestrian. Furthermore, the communication device can be arranged within a traffic infrastructure device.

The communication device can be configured to operate within a vehicle-to-X (V2X) communication network or a device-to-device (D2D) communication network. The vehicle-to-X (V2X) communication network or the device-to-device (D2D) communication network can be an IEEE 802.11p based communication network or a long term evolution (LTE) based communication network.

According to a fourth aspect, the application relates to a method of operating a communication device in a network-assisted communication mode for communicating with a plurality of communication devices. The method comprises receiving a communication resource selection message broadcasted by at least one further communication device of the plurality of communication devices. The further communication device is operated in an ad-hoc communication mode. The communication resource selection message includes information about a data channel communication resource for D2D communication selected by the further communication device. The method also comprises forwarding the information about the data channel communication resource selected by the further communication device to a base station of the cellular communication network. The method also comprises receiving a communication resource allocation message from the base station including information about a data channel communication resource allocated to the communication device. The method also comprises communicating with the plurality of communication devices using the allocated data channel communication resource.

According to a fifth aspect, the application relates to a base station configured to communicate with a first communication device operated in a network-assisted communication mode. The first communication device can be configured to communicate with further communication devices in the network-assisted communication mode using a plurality of communication resources. The base station is configured to receive a communication resource selection message from the first communication device (e.g. of a plurality of communication devices operated in a network-assisted communication mode). The communication resource selection message includes information about at least a first data channel communication resource of a plurality of communication resources selected by (at least) a second communication device operated in an ad-hoc communication mode. The base station is configured to allocate a communication resource (of the plurality of communication resources) to the first communication device operated in the network-assisted communication mode taking into account the already selected first data channel communication resource. The communication resource allocated to the first communication device can be different to the selected first data channel communication resource. The base station is configured to transmit a communication resource allocation message to the first communication device including information about the allocated communication resource.

A base station according to the fifth aspect of the application provides for an efficient, centrally managed sharing of communication resources between a first communication device operated in the network-assisted communication mode and a plurality of communication devices operated in the ad-hoc communication mode, leading to fewer collisions of communication devices selecting interfering communication resources. Hence, the effectiveness and the efficiency of a communication network comprising such a base station may be improved.

In a first possible implementation form of the fifth aspect of the application, the base station is further configured to receive further communication resource selection messages from further communication devices operated in the network-assisted mode, the further communication resource messages including information about further data channel communication resources selected by further communication devices operating in the ad-hoc mode. The base station is further configured to allocate the communication resource to the first communication device taking into account the further selected data channel communication resources. Doing so provides for an efficient, centrally managed sharing of communication resources between a plurality of communication devices operated in the network-assisted communication mode and a plurality of communication devices operated in the ad-hoc communication mode, leading to fewer collisions of communication devices selecting interfering communication resources. Hence, the effectiveness and the efficiency of a communication network comprising such a base station may be improved.

In a second possible implementation form of the fifth aspect of the application, or the first implementation form thereof, the base station is configured to broadcast a communication resource setup message. The communication resource set up message may be broadcast, for example, using a cellular broadcast channel like PBCH, for example to the plurality of communication devices in the network-assisted communication mode. The communication resource setup message may include information associated with the plurality of communication resources out of which the base station allocates resources to the plurality of communication devices in the network-assisted mode, and/or the plurality of communication resources out of which the communication devices in the ad-hoc communication mode select their communication resources, in particular information about a communication resource selection protocol or about ad-hoc mode control channel resources. By providing information associated with the plurality of communication resources, for instance, about a communication resource selection protocol to be used, from the base station to the communication device, a more systematic selection of communication resources can be achieved. Hence, the effectiveness and the efficiency of a communication network comprising such a base station may be improved.

In a third possible implementation form of the fifth aspect of the application, or the first or second implementation form thereof, the cellular communication network is a LTE network and the base station is configured to transmit the communication resource allocation message using a cellular based Physical Downlink Control Channel (PDCCH).

In a fourth possible implementation form of the fifth aspect of the application, or any one of the first to third implementation form thereof, the base station is configured to share the information about the selected first data channel communication resource and the information about the allocated communication resource with another base station of the cellular communication network. By sharing the information about the selected first data channel communication resource and the information about the allocated communication resource with another base station, the communication resources of a greater number of communication devices can be selected and allocated in an efficient and centrally managed way. Hence, the effectiveness and the efficiency of a communication network comprising such a base station may be improved.

According to a sixth aspect, the application relates to a method of operating a base station, such as the base station mentioned above. The method comprises receiving a communication resource selection message from a first communication device of a plurality of communication devices operated in a network-assisted communication mode. The communication resource selection message includes information about at least a first data channel communication resource of a plurality of communication resources selected by at least a second communication device operated in an ad-hoc communication mode. The method also comprises allocating a communication resource of the plurality of communication resources to the first communication device operated in a network-assisted communication mode, taking into account the already selected first data channel communication resource. The method also comprises transmitting a communication resource allocation message to the first communication device including information about the allocated communication resource. The communication resource allocated to the first communication device can be different to the selected first data channel communication resource.

The method according to the sixth aspect of the application can be performed, for instance, by the base station according to the fifth aspect of the application. Further features of the method according to the sixth aspect of the application result directly from the functionality of the base station according to the fifth aspect of the application.

According to a seventh aspect, the application relates to a computer program comprising a program code for performing the method according to the second aspect of the application, the method according to the fourth aspect of the application or the method according to the sixth aspect of the application when executed on a computer.

The application can be implemented in hardware and/or software.

BRIEF DESCRIPTION OF THE DRAWINGS

Further embodiments of the invention will be described with respect to the following figures.

DETAILED DESCRIPTION OF ILLUSTRATIVE EMBODIMENTS

Figure 1:
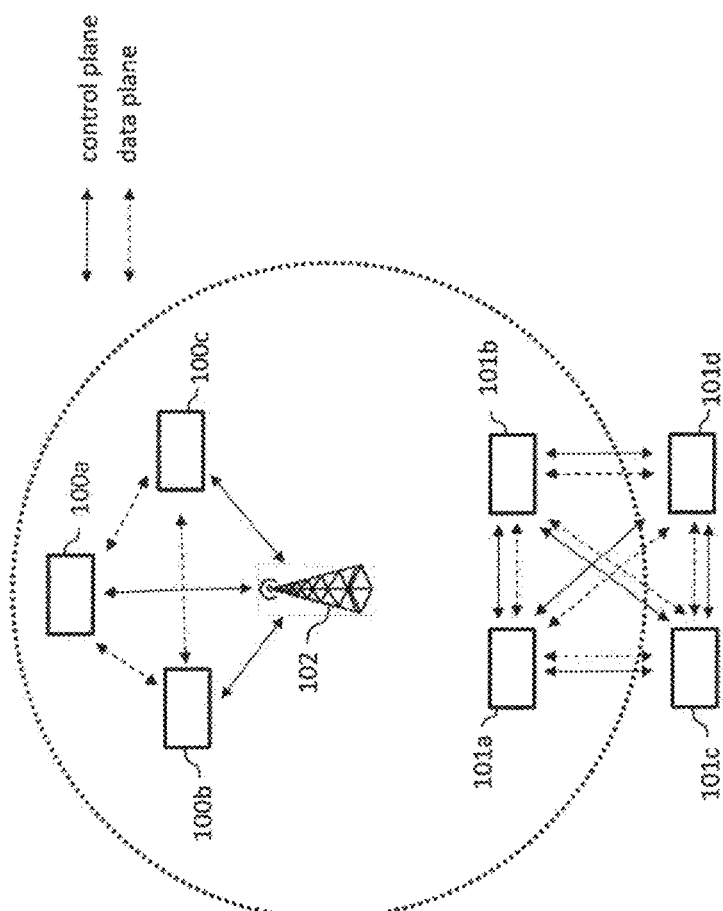
FIG. 1 shows a schematic diagram of a communication scenario including a plurality of communication devices operating in a network-assisted communication mode and in an ad-hoc communication mode according to an embodiment.

FIG. 1 shows a schematic diagram of a communication scenario including a plurality of communication devices operating in an ad-hoc communication mode and a network-assisted communication mode according to an embodiment. The upper half of FIG. 1 shows three exemplary communication devices 100a-c according to an embodiment. The three exemplary communication devices 100a-c are operating in a network-assisted communication mode and configured to communicate with an exemplary base station 102 of a cellular network. The lower half of FIG. 1 shows four exemplary communication devices 101a-d according to an embodiment. The four exemplary communication devices 101a-d are operating in the ad-hoc communication mode. The communication devices 100a-c and 101a-d can be configured to operate within a vehicle-to-X (V2X) communication network or a device-to-device (D2D) communication network. The term vehicle-to-X (V2X) communications is used to cover vehicle-to-vehicle (V2V), vehicle-to-infrastructure (V2I) and vehicle-to-X (V2X) communications. The vehicle-to-X (V2X) communication network or the device-to-device (D2D) communication network can be an IEEE 802.11p based communication network or a long term evolution (LTE) based communication network.

A communication device operating in the ad-hoc communication mode, such as the four exemplary communication devices 101a-d shown in FIG. 1, is configured to communicate with a plurality of communication devices, such as the communication devices 100a-c and/or the communication devices 101a-d, using a suitable communication radio frame.

Figure 2:
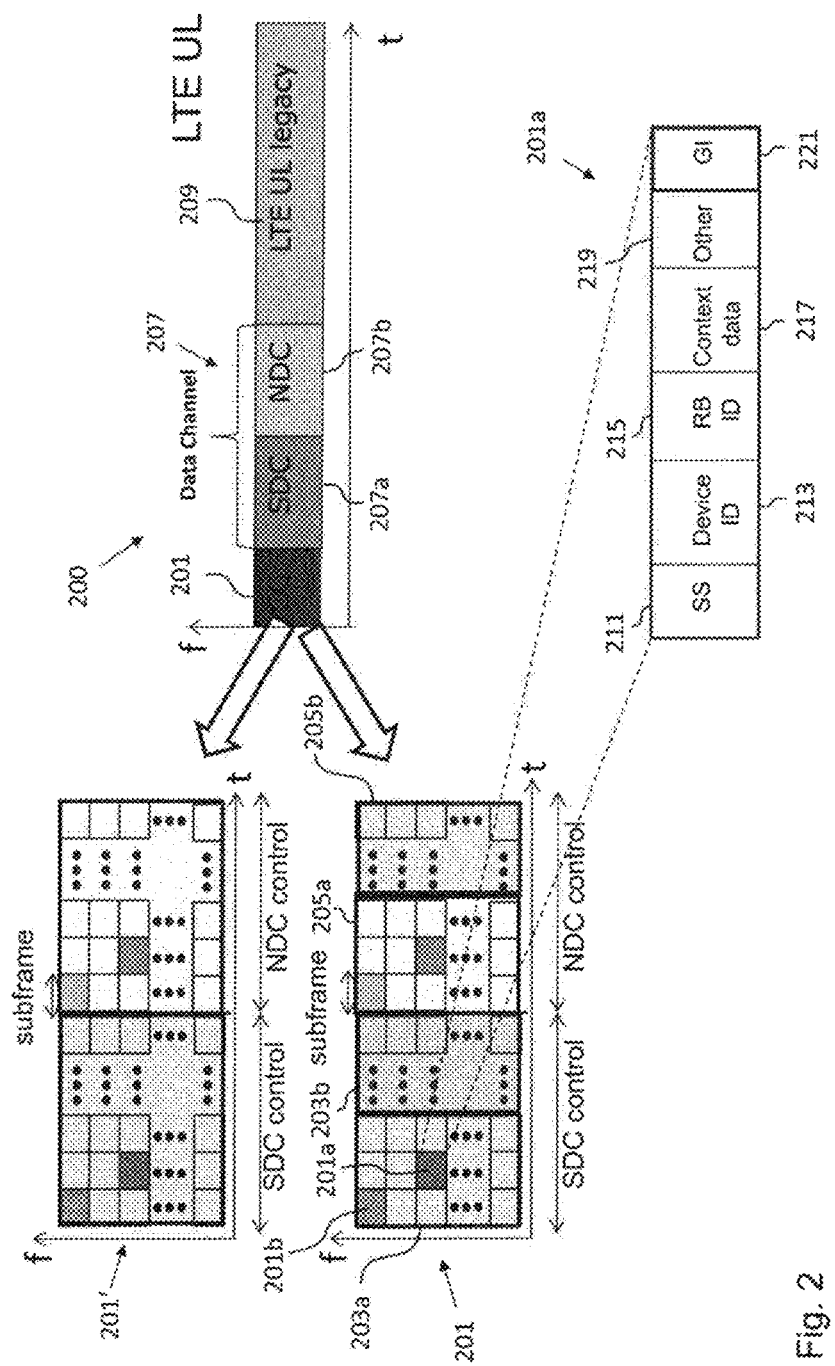
FIG. 2 shows a schematic diagram of a communication frame suitable in a communication device or method according to an embodiment.

FIG. 2 shows a schematic diagram of an embodiment of a communication frame 200 for network communication, in particular for device-to-device (D2D) network communication, that can be used by the communication devices 100a-c or 101a-d making use, as an example only, of an LTE uplink channel. The communication frame 200 comprises a control channel 201 and a data channel 207.

In an embodiment, the communication frame 200 can be a unified medium access control (MAC) frame. In an embodiment, the communication frame 200 can be embedded within a frequency division duplexing (FDD) uplink frequency band or a time division duplexing (TDD) uplink time frame of a LTE communication frame. In an embodiment, the communication frame 200 can be embedded within a physical uplink shared channel (PUSCH) and/or a physical uplink control channel (PUCCH) of a LTE communication frame.

Typically, control data provided by a communication resource within the control channel 201 of the communication frame 200 defines communication resources within the data channel 207 communicating specific payload data. In other words, the control data within the control channel 201 of the communication frame provides a mapping to the payload data within the data channel 207 of the communication frame 200.

The control channel 201 can enable a fine-tuned synchronization, a direct neighboring device discovery, a paging, a communication resource reservation for data and can be used for exchanging communication device context information, e.g. a geographic position of a communication device.

The control channel 201 can have a permanent set of communication resources, e.g. used for a L1/L2 control among communication devices. The control channel 201 length or size can be configurable, e.g. based on a communication device density. A multi-user control channel access protocol can be used.

The data channel 207 can comprise a high priority portion 207a (referred to in FIG. 2 as "Safety Data Channel" or short "SDC") and a low priority portion 207b (referred to in FIG. 2 as "Non-Safety Data Channel" or short "NDC").

The high priority portion 207a of the data channel 207, i.e. the SDC portion, can be reserved for high priority data, e.g. hard quality of service (QoS) safety vehicle-to-X (V2X) traffic data, with high priority. It can support mixed data or traffic types, e.g. semi-persistent communication resource patterns for cooperative awareness message (CAM) periodical messages, and/or an on-demand communication resource reservation for context-rich mission-critical data (CMD). A multi-user high priority data channel communication resource reservation protocol can be used.

The low priority portion 207b of the data channel 207, i.e. the NDC portion, can serve low priority data, e.g. soft quality of service (QoS) vehicle-to-X (V2X) traffic data, with low priority, e.g. traffic efficiency application data. It can give up priority for high priority data, e.g. hard quality of service (QoS) safety traffic data. A multi-user communication resource coordination in the low priority portion 207b, i.e. the NDC portion, can be based on an on-demand reservation scheme or a carrier sense multiple access (CSMA) type reservation scheme.

The communication resources of the high priority portion 207a of the data channel 207, i.e. the SDC portion, and the low priority portion 207b of the data channel 207, i.e. the NDC portion, can be multiplexed, for instance, in the frequency domain and/or the time domain.

In the embodiment shown in FIG. 2, the communication frame 200 is embedded within an uplink LTE communication frame that can further comprise an uplink LTE communication frame portion 209. Thus, an allocation of connected communication resources within a long term evolution (LTE) structure is possible. In a downlink communication portion, communication resources may not be allocated connectedly since control frames may appear every 1 ms. A concurrent downlink (DL) receive can be achieved.

In an embodiment, when using a long term evolution (LTE) frequency division duplexing (FDD) carrier, communications can be performed within a physical uplink shared channel (PUSCH). Thus, after communication of the communication frame 200, normal long term evolution (LTE) communications can take place.

As can be taken from the more detailed view of the communication frame 200 shown on the bottom left hand side of FIG. 2, in an embodiment the control channel 201 of the communication frame 200 comprises a high priority control channel part ("SDC control") and a low priority control channel part ("NDC control"). In the embodiment shown in FIG. 2, the high priority part of the control channel 201 is divided into an ad-hoc communication mode control channel portion 203a and a network-assisted communication mode control channel portion 203b. Likewise, in the embodiment shown in FIG. 2, the low priority part of the control channel 201 is divided into an ad-hoc communication mode control channel portion 205a and a network-assisted communication mode control channel portion 205b.

FIG. 2 shows two exemplary communication resources, in particular resource blocks 201a and 201b, within the ad-hoc communication mode control channel portion 203a of the high priority part of the control channel 201. As can be taken from the more detailed view shown on the bottom right hand side of FIG. 2, the exemplary communication resource, in particular resource block 201a, comprises a plurality of data fields, such as a synchronization sequence or signal (SS) 211, a device ID 213, a resource block ID 215, context data 217, such as information about the location of a device, a field for other data 219 and a guard interval (GI) 221.

The synchronization sequence or signal (SS) 211, for instance, allows synchronizing communication devices operating in the ad-hoc communication mode, such as the communication devices 101a-d shown in FIG. 1.

The top left hand side of FIG. 2 shows an embodiment of a control channel 201', which can be used when no network assistance is available. In this case the control channel 201' can comprise only a high priority part (referred to as "SDC control" in FIG. 2) and a low priority part (referred to as "NDC control" in FIG. 2).

In an embodiment, the communication frame 200 can be structured depending on a mode from a set of modes, wherein the set of modes comprises the ad-hoc communication mode and the network-assisted communication mode. Or in short, the ad-hoc mode and network-assisted mode. In an embodiment, the communication frame 200 can be switched between the ad-hoc communication mode and the network-assisted communication mode and vice versa, for instance, according to cellular network coverage and/or whether a communication device is in an idle mode or a connected mode with respect to a cellular network. Thus, a decision criterion for automatic mode switching can be provided.

A communication device operating in the ad-hoc communication mode, such as the four exemplary communication devices 101a-d shown in FIG. 1, is configured to select a data channel communication resource from a plurality of communication resources of the data channel 207 of the communication frame 200. The communication device operating in the ad-hoc communication mode is further configured to select an ad-hoc mode control channel resource from a plurality of ad-hoc mode control channel resources, for instance from the ad-hoc communication mode control channel portion 203a and/or 205a of the communication frame 200 shown in FIG. 2. The communication device is further configured to broadcast, using the selected ad-hoc mode control channel resource, a communication resource selection message including information about the selected data channel communication resource to the plurality of other communication devices in the vicinity of the communication device. The communication device is further configured to communicate with at least one of the plurality of other communication devices using the selected data channel communication resource.

In an embodiment, the communication device 101a-d operating in the ad-hoc communication mode is further configured to receive a communication resource setup message from the base station 102, where the communication resource setup message indicates the plurality of ad-hoc mode control channel resources. In an embodiment, the communication device 101a-d is further configured to select the ad-hoc mode control channel resources out of the indicated ad-hoc mode control channel resources.

In an embodiment, the communication device 101a-d operating in the ad-hoc communication mode is configured to receive a communication resource setup message comprising information about a communication resource selection protocol. In an embodiment, the communication device 101a-d is further configured to select the data channel communication resource or the ad-hoc mode control channel communication resource on the basis of the communication resource selection protocol.

In an embodiment, the communication device 101a-d operating in the ad-hoc communication mode is further configured to receive a communication resource allocation message from a further communication device of the plurality of communication devices 100a-c which are operated in an network-assisted communication mode. The communication resource allocation message includes information about at least a further data channel communication resource selected by the further communication device 100a-c. In an embodiment, the communication device 101a-d is configured to select the data channel communication resource taking into account the further data channel resource selected by the further communication device 100a-c.

In an embodiment, the communication device 101a-d operating in the ad-hoc communication mode is configured to decode assisted mode control channel communication resources reserved for the assisted mode control channel to receive the communication resource allocation message.

A communication device operating in the network-assisted communication mode, for instance the exemplary communication device 100a shown in FIG. 1, is configured to communicate with a plurality of other communication devices, such as the communication devices 100b-c and 101a-d shown in FIG. 1. The communication device 100a is configured to receive a communication resource selection message broadcasted by at least one further communication device of the plurality of other communication devices, where the further communication device is operated in the ad-hoc communication mode, such as the communication devices 101a-d shown in FIG. 1. The communication resource selection message includes information about a data channel communication resource for D2D communication selected by the further communication device. The communication device 101a is configured to forward the information about the data channel communication resource selected by the further communication device to the base station 102 of the cellular communication network. The communication device 101a is configured to receive a communication resource allocation message from the base station 102 including information about a data channel communication resource allocated to the communication device 101a. The communication device 101a is configured to communicate with the plurality of other communication devices using the allocated data channel communication resource.

In an embodiment, the communication device 100a-c operating in the network-assisted communication mode is configured to broadcast to the plurality of communication devices 100a-c, 101a-d, operated in the ad-hoc or assisted communication mode, a message indicating the data channel resource allocated to the communication device 100a-c.

In an embodiment, the communication device 100a-c operating in the network-assisted communication mode is configured to broadcast the message indicating the data channel resource allocated to the communication device 100a-c using an assisted mode control channel resource allocated by the base station 102 and reserved for the network-assisted communication mode.

In an embodiment, the communication device 100a-c operating in the network-assisted communication mode is configured to forward the information about the communication resource selected by the further communication device 101a-d to the base station 102 as part of a request for allocating further communication resources, in particular cellular communication resources, for a communication between the base station 102 and the communication device 100a-c.

In an embodiment, the communication device 100a-c operating in the network-assisted communication mode is configured to switch from the network-assisted communication mode to the ad-hoc communication mode upon the release of a radio bearer between the base station 102 and the communication device 100a-c.

A base station, such as the base station 102 shown in FIG. 1, is configured to communicate with a plurality of communication devices operated in a network-assisted communication mode, such as the communication devices 100a-c shown in FIG. 1. The plurality of communication devices 100*a-c* operated in a network-assisted communication mode are configured to communicate with each other using a plurality of communication resources of a communication frame, such as the communication frame 200 shown in FIG. 2. The base station 102 is configured to receive a communication resource selection message from a first communication device of the plurality of communication devices 100*a-c* operated in a network-assisted communication mode. The communication resource selection message includes information about at least a first data channel communication resource of a plurality of communication resources selected by at least one communication device operated in an ad-hoc communication mode, such as the communication devices 101*a-d* shown in FIG. 1. The base station 102 is configured to allocate a communication resource of the plurality of communication resources of the communication frame 200 to the first communication device operated in a network-assisted communication mode taking into account the already selected first data channel communication resource. The base station 102 is configured to transmit a communication resource allocation message to the first communication device including information about the allocated communication resource of the communication frame 200.

In an embodiment, the base station 102 is further configured to receive further communication resource selection messages from further communication devices 100*a-c* operated in the network-assisted mode, the further communication resource messages including information about further data channel communication resources selected by further communication devices 101*a-d* operating in the ad-hoc mode. The base station 102 is further configured to allocate the communication resource to the first communication device 100*a-c* taking into account the further selected data channel communication resources.

In an embodiment, the base station 120 is configured to broadcast, for instance, using a cellular broadcast channel like PBCH to the plurality of communication devices 100*a-c*, a communication resource setup message including information associated with the plurality of communication resources, in particular information about a communication resource selection protocol or about ad-hoc communication mode control channel resources.

In an embodiment, the cellular communication network is a LTE network, and the base station 102 is configured to transmit the communication resource allocation message using a cellular based Physical Downlink Control Channel (PDCCH).

In an embodiment, the base station 102 is configured to share the information about the selected first data channel communication resource and the information about the allocated communication resource with another base station of the cellular communication network.

In an embodiment, each of the three exemplary communication devices 100*a-c* operating in the network-assisted communication mode is configured to switch into the ad-hoc communication mode. Likewise, each of the four exemplary communication devices 101*a-d* operating in the ad-hoc communication mode is configured to switch into the network-assisted communication network, for instance, in case a cellular network becomes available.

In an embodiment, the ad-hoc communication mode and the network-assisted communication mode can coexist with a legacy cellular mode, which can complement each other in order to provide a complete vehicle-to-X (V2X) solution.

In the network-assisted communication mode, the cellular communication network can provide a fine-grained physical layer synchronization and a high degree of control of device-to device (D2D) communications via a radio resource control (RRC) signaling, e.g. using a coordinated resource allocation, a system information broadcast mode selection, a power control, and a differentiated quality of service (QoS) support with priority handling. This mode can be preferred when available. The communication network operator can be willing to support it or may have enough radio communication resources to support it.

In the ad-hoc communication mode, fully distributed ad-hoc communications among vehicle-to-X (V2X) communication devices can take place in both data and control plane. It can be an operator free solution. It can be used when the operator may not provide cellular communication network coverage in certain areas, e.g. rural areas, mountain areas, or tunnel areas, or if the operator is not able and/or willing to support vehicle-to-X (V2X) applications.

In the following, further implementation forms and embodiments of the invention are described.

In an embodiment, the ad-hoc communication mode corresponds to the LTE "RRC-Idle" mode and the network-assisted communication mode corresponds to the LTE "RRC-Connected" mode.

In the following example, LTE FDD is used as a cellular radio network which coexists with a V2X communication network in a shared UL spectrum band. The description below of how the V2X communication frame is embedded in the cellular radio communication frame is also just one of many possible implementations.

Figure 3:
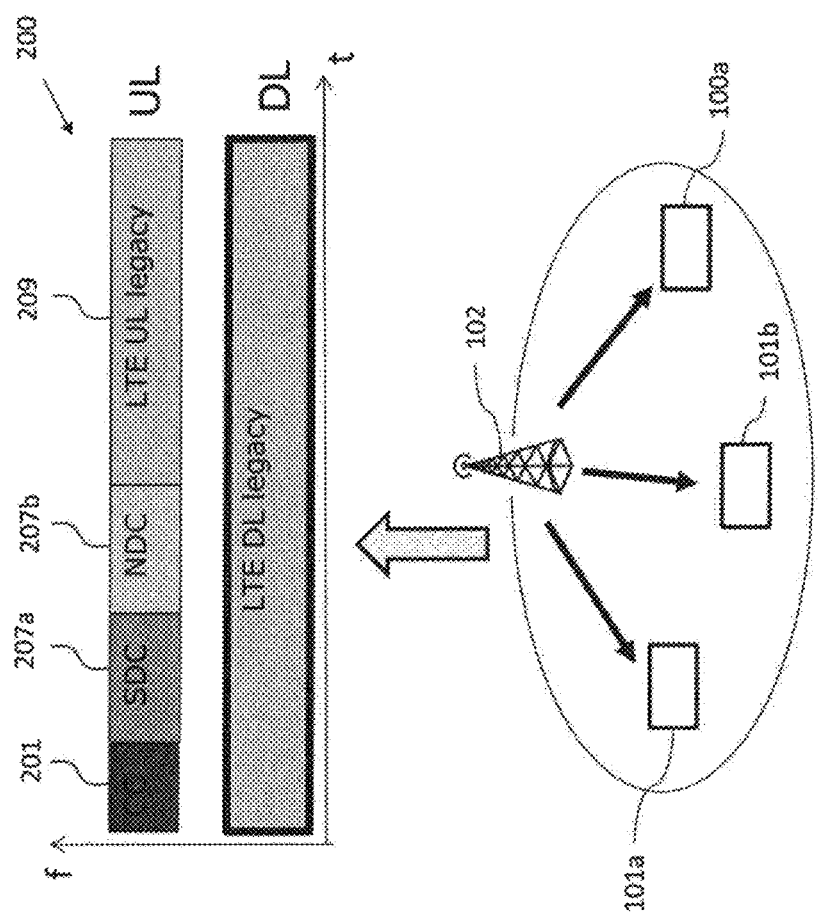
FIG. 3 shows a schematic diagram of a first stage of a communication resource allocation process according to an embodiment.

FIG. 3 shows a schematic diagram illustrating a first stage of a communication resource allocation process according to an embodiment. The base station 102 broadcasts V2X resource pool info and control info to all the V2X devices (such as the communication devices mentioned above) such that all of them have the same context of V2X services in the serving cell. In an embodiment, the resource pool information provided by the base station 102 can include the following information: information about the configuration of the control channel 201 of the control frame 200 including its high priority part and its low priority part, information about the carrier frequencies of a set of V2X communication bands, both in and out of cellular network coverage, information about usage priorities of communication resources between communication devices operating in the ad-hoc mode communication mode and communication devices operating in the network-assisted communication mode" device, between different and/or between different types of traffic, such as V2X traffic and cellular radio traffic, and/or information about mode selection rules and state transition rules.

In an embodiment, this broadcast signaling by the base station 102 can be accomplished by defining a new system information block (SIB) in the cellular radio network downlink (DL), for instance LTE DL, or by defining a new cellular radio DL broadcast signaling.

Figure 4:
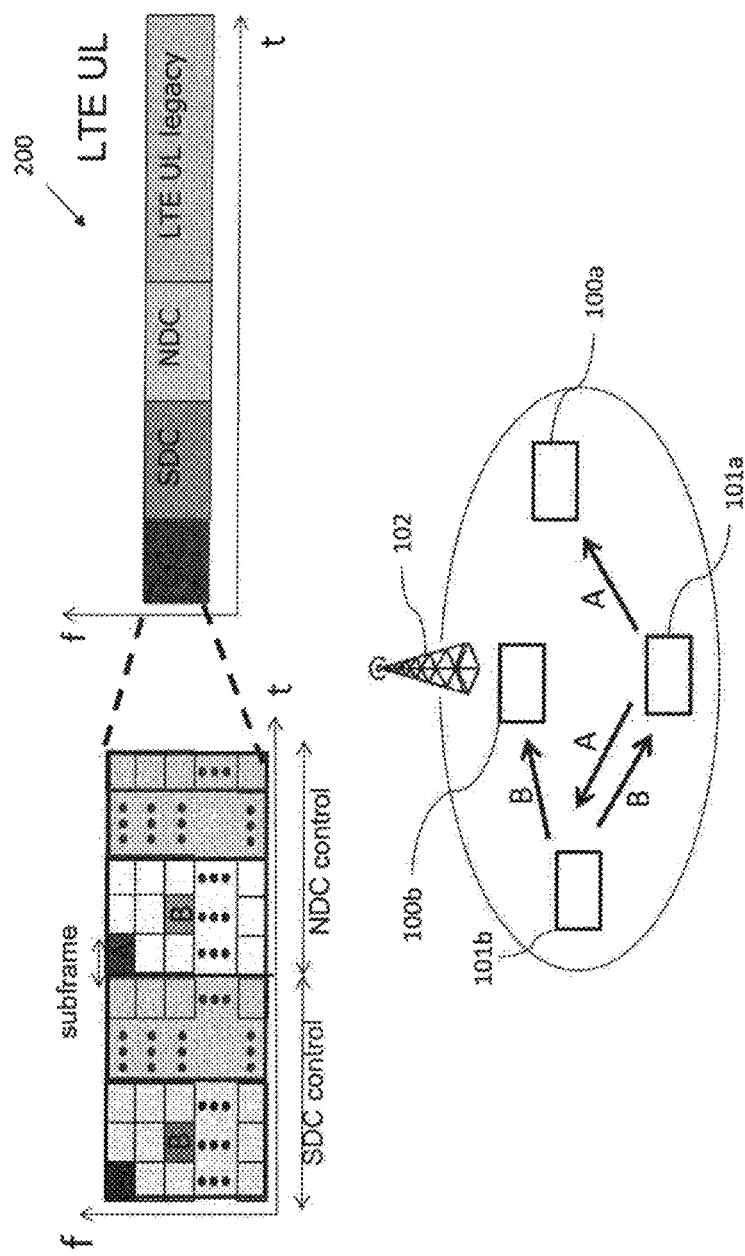
FIG. 4 shows a schematic diagram of a second stage of a communication resource allocation process according to an embodiment.

FIG. 4 shows a schematic diagram illustrating a second stage of a communication resource allocation process according to an embodiment. Firstly, the communication devices operating in the ad-hoc mode communication mode, such as the communication devices 101*a* and 101*b* shown in FIG. 4, perform a distributed communication resource selection. In an embodiment, the distributed communication resource selection can comprise the following steps. The communication devices operating in the ad-hoc mode communication mode, such as the communication devices 101*a* and 101*b* shown in FIG. 4, autonomously select a control channel communication resource within the ad-hoc communication mode control region, for instance within the portions 203a and/or 205a of the control channel 201 of the control frame 200 shown in FIG. 2. Then, the communication devices operating in the ad-hoc mode communication mode, such as the communication devices 101a and 101b shown in FIG. 4, autonomously select a data channel resource among the PUSCH communication resources. Finally, the communication devices operating in the ad-hoc mode communication mode, such as the communication devices 101a and 101b shown in FIG. 4, broadcast a control message to all neighbors within the "ad-hoc communication mode control region", i.e. the region within a coverage area of a communication device operating in the ad-hoc mode communication mode. For more details about a suitable distributed communication resource selection for the communication devices operating in the ad-hoc mode communication mode, reference is made to PCT/EP2014/074742, which is fully incorporated herein by reference.

While the communication devices operating in the ad-hoc communication mode perform a coordinated communication resource selection, the communication devices operating in the network-assisted communication mode, such as the communication devices 100a and 100b shown in FIG. 4, decode all the control messages from the communication devices operating in the ad-hoc communication mode within their ad-hoc communication mode control region, but do not transmit any control message. By doing so, the communication devices operating in the network-assisted communication mode are informed about the radio communication resources that have been selected by the communication devices operating in the ad-hoc communication mode. For more details reference is again made to PCT/EP2014/074742.

As the base station 102 has no information about the communication resources that have been selected by the communication devices 101a, 101b operating in the ad-hoc communication mode, since these do not have a UL connectivity to the base station 102, the base station relies on the communication devices 100a, 100b operating in the network-assisted communication mode to relay such information to the base station 102. This allows the base station 102 to make a resource allocation decision for the communication devices 100a, 100b operating in the network-assisted mode, without interfering with the communication resources already selected by the communication devices 101a, 101b operating in the ad-hoc communication mode.

Figure 5:
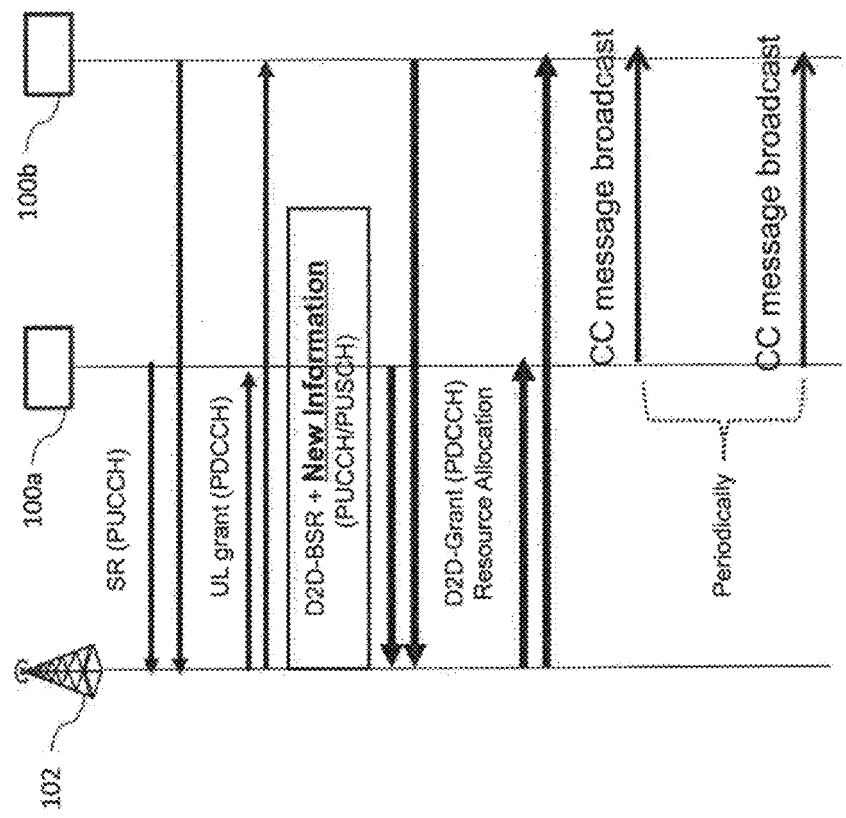
FIG. 5 shows a schematic diagram of a detail of a communication resource allocation process according to an embodiment.
Figure 6:
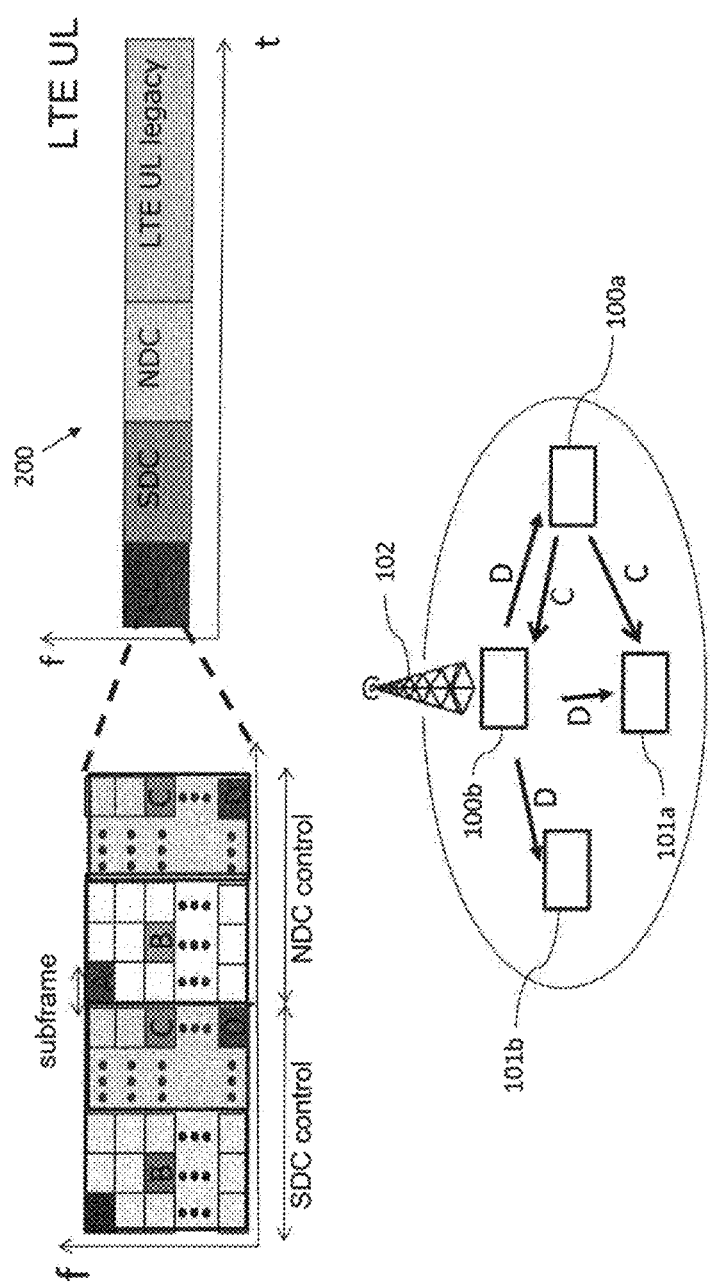
FIG. 6 shows a schematic diagram of a third stage of a communication resource allocation process according to an embodiment.

As shown in FIG. 5, by modifying the legacy LTE UL grant request procedures, communication devices operating in the network-assisted communication mode, such as the communication devices 100a and 100b shown in FIG. 6, can request radio communication resources via a cellular radio UL procedure and an UL resource, for instance, LTE PUCCH (Physical Uplink Control Channel), with new information in the cellular radio UL request, such as: a communication device ID, communication device context info, such as position and/or velocity, information about the communication resource selections made by local (i.e. neighboring) communication devices operating in the ad-hoc communication mode.

Having received the relay information from the communication devices operating in the network-assisted communication mode, the base station 102 decides on the set of radio communication resources that have not been reserved yet by the communication devices operating in the ad-hoc communication mode. In an embodiment, where the communication devices operating in the ad-hoc communication mode have priority, the base station 102 allocates collision-free control and data channel communication resources to each communication device operating in the network-assisted communication mode via PDCCH (Physical Downlink Control Channel) from those communication resources that are not reserved by the communication devices operating in the ad-hoc communication mode. In practice, the information relay from the assisted-mode devices will be utilized in the resource allocation of the next communication frame, but not in the current frame, due to the delay of signaling between base stations of the cellular network, such as the base station 102, and the communication devices operating in the network-assisted communication mode.

As schematically illustrated in FIG. 5, upon receiving the communication radio resource allocation from the base station 102, the communication devices operating in the network-assisted communication mode, such as the communication devices 100a and 100b shown in FIG. 6, broadcast their control messages to neighbors in the assisted mode control region. In an embodiment, the control message has the same content as the one for the communication devices operating in the ad-hoc communication mode.

To further illustrate the above steps described in the context of FIGS. 3 to 6, a simple example of how some embodiments of the present invention can be applied, where LTE FDD is used, will be described below under reference to FIGS. 7 to 9.

Figure 7:
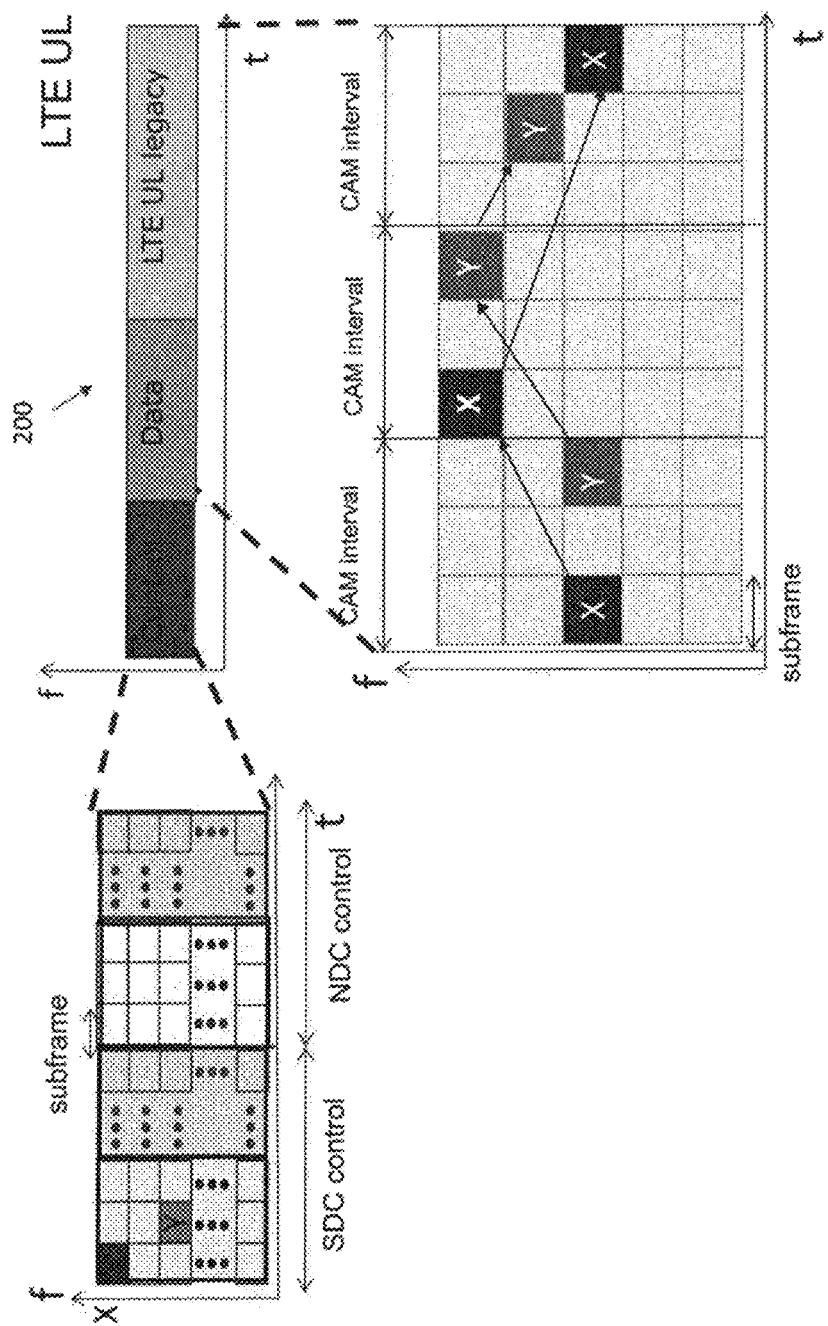
FIG. 7 shows a schematic diagram illustrating the allocation of communication resources by communication devices according to an embodiment.
Figure 8:
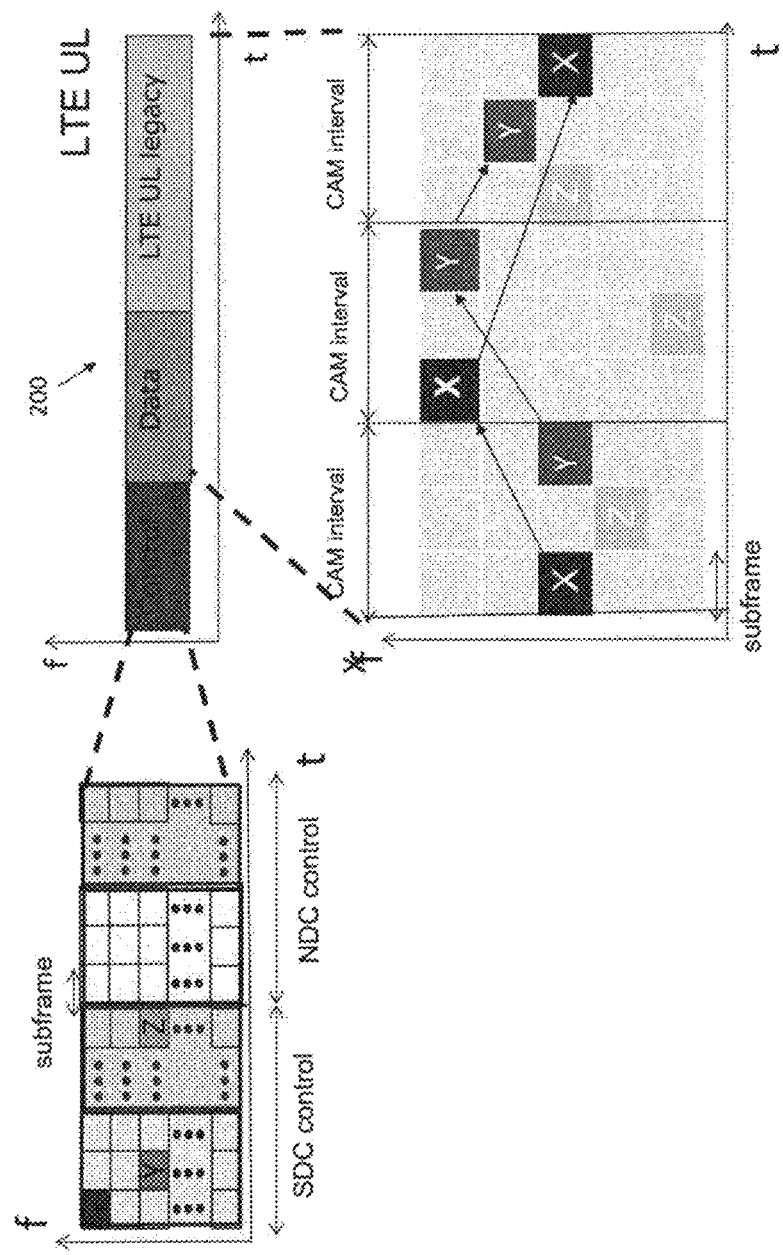
FIG. 8 shows a schematic diagram illustrating the allocation of communication resources by communication devices according to an embodiment.
Figure 9:
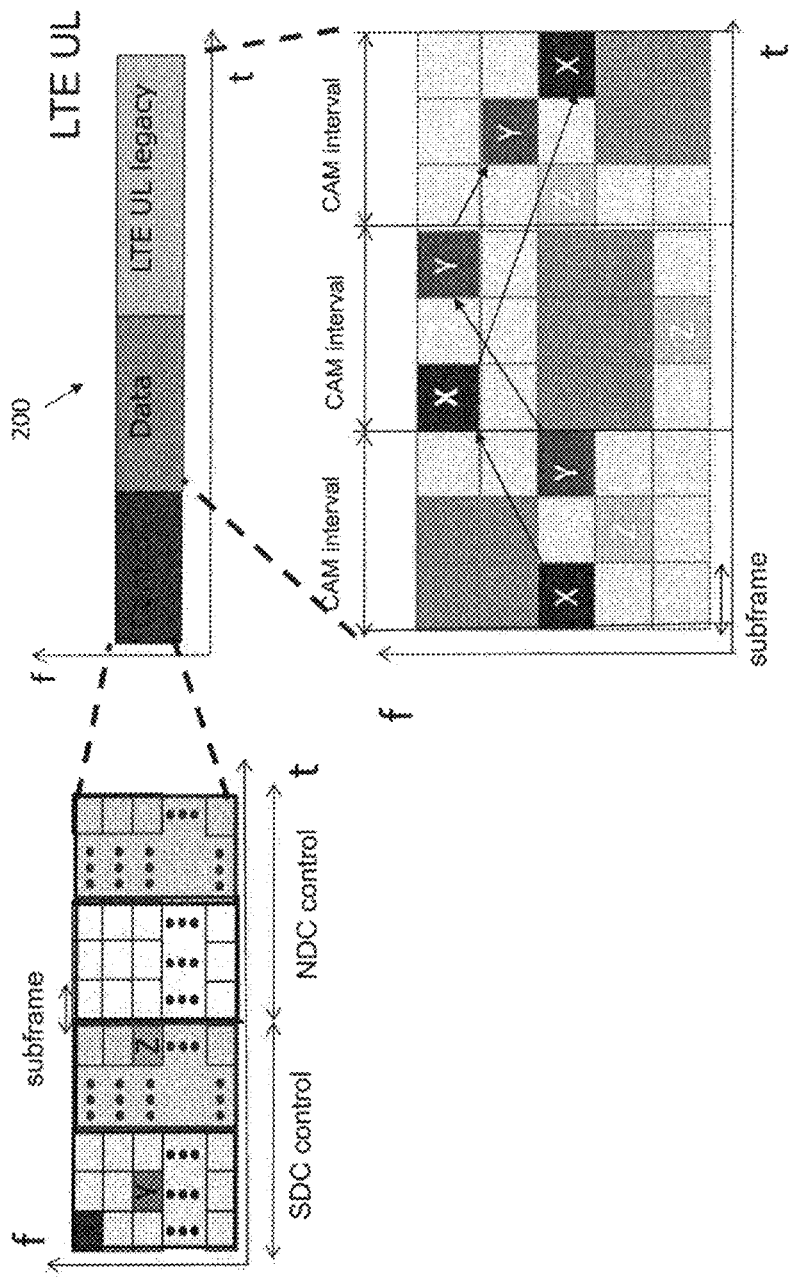
FIG. 9 shows a schematic diagram illustrating the allocation of communication resources by communication devices according to an embodiment.

In the example shown in FIGS. 7 to 9, a communication device X and a communication device Y, both operating in the ad-hoc communication mode, need to broadcast a safety CAM message to their neighboring communication devices. The communication devices X and Y are assumed to have priority over other communication devices operating in the network-assisted communication mode and legacy cellular communication devices. The communication devices X and Y firstly select two different control channel communication resources in the ad-hoc communication mode control region of the SDC control channel part. Then, they select two different sets of data channel communication resources (which in the example consist of 3 resource blocks for 3 CAM intervals) to broadcast the CAM messages. Thereafter, the communication devices X and Y broadcast their control messages over their selected control channel resources in the "ad-hoc mode control region". Finally, the communication devices X and Y broadcast the CAM messages in their respectively selected set of radio communication resources (marked as "X" and "Y" respectively) in the data channel. During this phase, the communication devices operating in the network-assisted communication mode monitor and decode the control messages in the "ad-hoc mode control region" and get to know which communication resources have been selected by the devices X and Y. This information is relayed by the communication devices operating in the network-assisted communication mode to the base station 102.

In FIG. 8 the communication device Z operating in the network-assisted communication mode has the second highest priority to be allocated radio communication resources of both the control and the data channel. The base station 102 allocates the set of radio communication resources Z that are not utilized by the communication devices X and Y to the communication device Z as its data channel communication resources.

In FIG. 9 additional empty resource blocks are used for a legacy LTE UL scheduling by following a legacy LTE UL scheduling algorithm and signaling. On top of the radio resource allocation of the V2X communication devices, the LTE UL scheduling can take place with lowest priority in comparison with the safety relevant traffic of the V2X communication devices.

Figure 10:
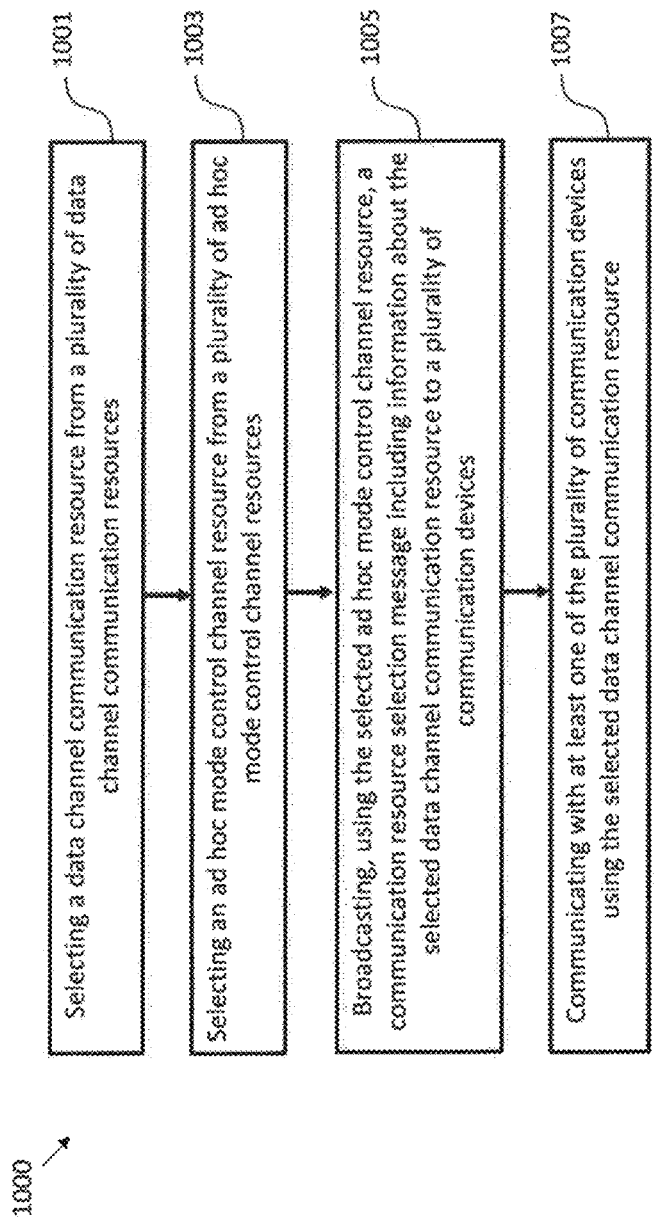
FIG. 10 shows a flow diagram illustrating a method of operating a communication device in an ad-hoc communication mode according to an embodiment.

FIG. 10 shows a flow diagram illustrating a method 1000 of operating a communication device, such as one of the communication devices 101a-d, in an ad-hoc communication mode for communicating with a plurality of communication devices, such as the communication devices 100a-c, 101a-d, according to an embodiment. The method 1000 comprises the following steps.

A step 1001 of selecting a data channel communication resource from a plurality of data channel communication resources. A step 1003 of selecting an ad-hoc mode control channel resource from a plurality of ad-hoc mode control channel resources. A step 1005 of broadcasting, using the selected ad-hoc mode control channel resource, a communication resource selection message including information about the selected data channel communication resource to the plurality of communication devices, such as the communication devices 100a-c, 101a-d. A step 1007 of communicating with at least one of the plurality of communication devices, such as the communication devices 100a-c, 101a-d, using the selected data channel communication resource.

Figure 11:
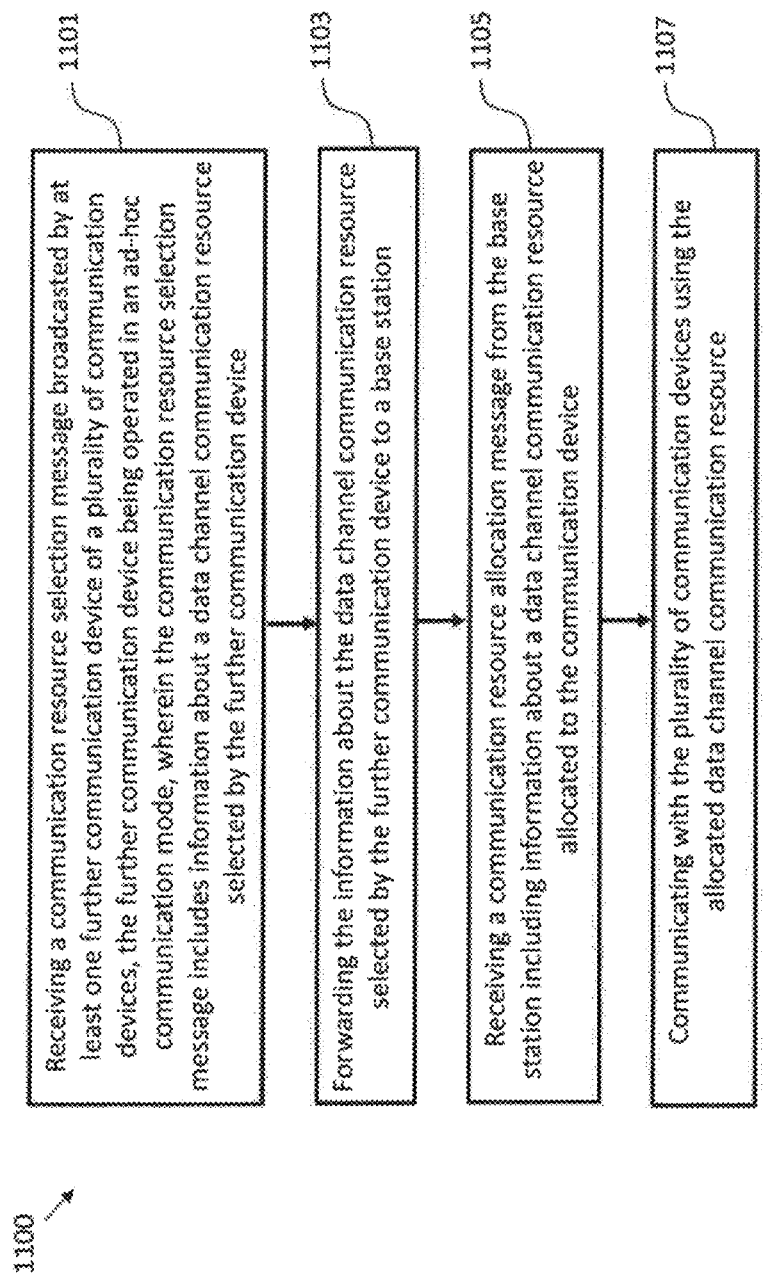
FIG. 11 shows a flow diagram illustrating a method of operating a communication device in a network-assisted communication mode according to an embodiment.

FIG. 11 shows a flow diagram illustrating a method 1100 of operating a communication device in a network-assisted communication mode, such as one of the communication devices 100a-c, for communicating with a plurality of communication devices, such as the communication devices 100a-c, 101a-d, according to an embodiment. The method 1100 comprises the following steps.

Step 1101 includes receiving a communication resource selection message broadcasted by at least one further communication device of the plurality of communication devices, the further communication device being operated in an ad-hoc communication mode, such as one of the communication devices 101a-d. The communication resource selection message includes information about a data channel communication resource selected by the further communication device, such as one of the communication devices 101a-d. Step 1103 includes forwarding the information about the data channel communication resource selected by the further communication device, such as one of the communication devices 101a-d, to a base station, such as the base station 102. Step 1105 includes receiving a communication resource allocation message from the base station, such as the base station 102, including information about a data channel communication resource allocated to the communication device, such as one of the communication devices 100a-c. Step 1107 includes communicating with the plurality of communication devices, such as the communication devices 100a-c, 101a-d, using the allocated data channel communication resource.

Figure 12:
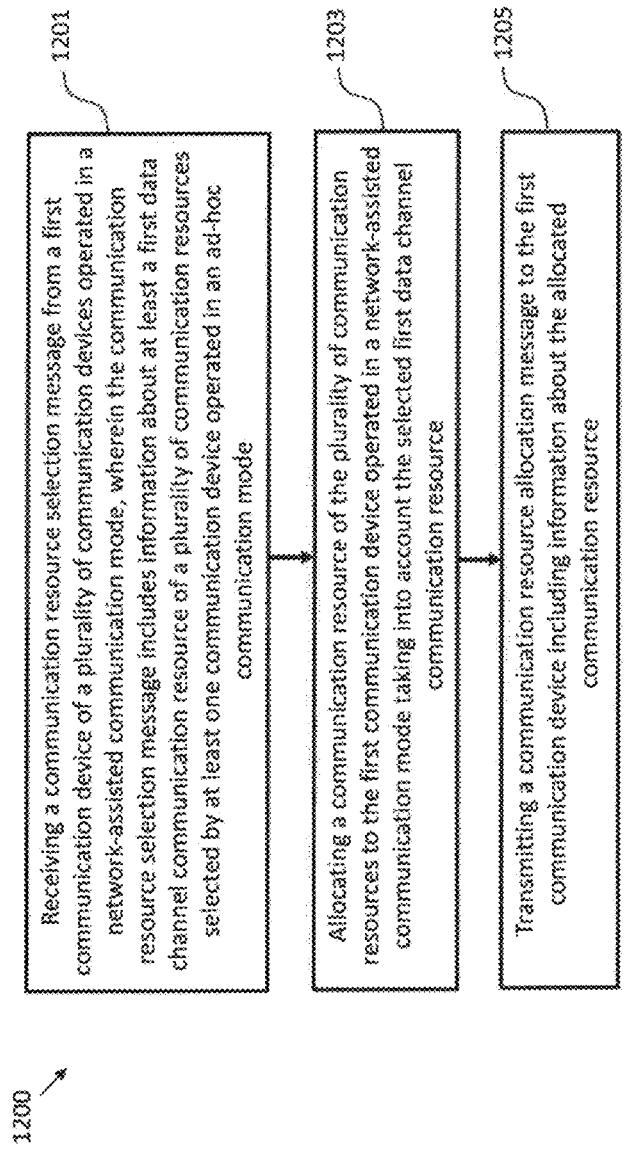
FIG. 12 shows a flow diagram illustrating a method of operating a base station according to an embodiment.

FIG. 12 shows a flow diagram illustrating a method 1200 of operating a base station, such as the base station 102, configured to communicate with a plurality of communication devices operated in a network-assisted communication mode, such as the communication devices 100a-c, according to an embodiment. The method 1200 comprises the following steps.

Step 1201 includes receiving a communication resource selection message from a first communication device of the plurality of communication devices operated in a network-assisted communication mode, such as the communication devices 100a-c. The communication resource selection message includes information about at least a first data channel communication resource of a plurality of communication resources selected by at least one communication device operated in an ad-hoc communication mode, such as the communication devices 101a-d. Step 1203 includes allocating a communication resource of the plurality of communication resources to the first communication device operated in a network-assisted communication mode, such as one of the communication devices 100a-c, taking into account the selected first data channel communication resource. Step 1205 includes transmitting a communication resource allocation message to the first communication device operated in a network-assisted communication mode, such as one of the communication devices 100a-c, including information about the allocated communication resource.

Embodiments of the invention may be implemented in a computer program for running on a computer system, at least including code portions for performing steps of a method according to the application when run on a programmable apparatus, such as a computer system or enabling a programmable apparatus to perform functions of a device or system according to the application. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

Although the application is described with reference to specific features, implementation forms, and embodiments, it is evident that various modifications and combinations can be made thereto without departing from the spirit and scope of the application. The description and the figures are, accordingly, to be regarded simply as an illustration of the application as defined by the appended claims, and are contemplated to cover any and all modifications, variations, combinations, or equivalents that fall within the scope of the application.

What is claimed is:

1. A first communication device, comprising:
a processor; and
a non-transitory computer-readable storage medium storing a program to be executed by the processor, the program including instructions for:
  selecting a data channel communication resource from a plurality of data channel communication resources;
  selecting an ad-hoc mode control channel resource from a plurality of ad-hoc mode control channel resources, wherein the first communication device operates in an ad hoc communication mode for communicating with a plurality of second communication devices;
  broadcasting, using the selected ad-hoc mode control channel resource, a communication resource selection message to the plurality of second communication devices;
  communicating with at least one of the plurality of second communication devices using the selected data channel communication resource; and
  receiving a communication resource allocation message from a second communication device of the plurality of second communication devices, the second communication device being operated in an network-assisted communication mode, the communication resource allocation message including information about at least a further data channel communication resource selected by the second communication device; and wherein selecting the data channel communication resource from the plurality of data channel communication resources comprises selecting the data channel communication resource taking into account the further data channel communication resource selected by the second communication device.

2. The first communication device of claim 1, wherein the program further includes instructions for:
receiving a communication resource setup message from a base station, the communication resource setup message indicating the plurality of ad-hoc mode control channel resources; and
wherein selecting the ad-hoc mode control channel resource from the plurality of ad-hoc mode control channel resources comprises selecting the ad-hoc mode control channel resource out of the indicated plurality of ad-hoc mode control channel resources in the communication resource setup message.

3. The first communication device of claim 1, wherein the program further includes instructions for:
receiving a communication resource setup message comprising information about a communication resource selection protocol;
wherein selecting the data channel communication resource from the plurality of data channel communication resources and selecting the ad-hoc mode control channel resource from the plurality of ad-hoc mode control channel resources comprises selecting the data channel communication resource or the ad-hoc mode control channel resource on the basis of the communication resource selection protocol.

4. The first communication device of claim 1, wherein the program further includes instructions for:
decoding network-assisted mode control channel communication resources to receive the communication resource allocation message.

5. A first communication device, comprising:
a processor; and
a non-transitory computer-readable storage medium storing a program to be executed by the processor, the program including instructions for:
receiving a communication resource selection message broadcasted by at least one second communication device of a plurality of second communication devices, the second communication device being operated in an ad-hoc communication mode, wherein the first communication device is configured to operate in a network-assisted communication mode, in which an active connection is established to a base station, for communicating with the plurality of second communication devices, and wherein the communication resource selection message includes information about a first data channel communication resource selected by the second communication device;
forwarding the information about the first data channel communication resource selected by the second communication device to the base station;
receiving a communication resource allocation message from the base station, the communication resource allocation message including information about a second data channel communication resource allocated to the first communication device, wherein the second data channel communication resource allocated to the first communication device is different that the first data channel communication resource selected by the second communication device;
communicating with the plurality of second communication devices using the second data channel communication resource allocated to the first communication device; and
switching from the network-assisted communication mode to the ad-hoc communication mode upon a release of a radio bearer between the base station and the first communication device.

6. The first communication device of claim 5, wherein the program further includes instructions for:
broadcasting, to the plurality of second communication devices, a message indicating the second data channel communication resource allocated to the first communication device.

7. The first communication device of claim 6, wherein the program further includes instructions for broadcasting the message indicating the second data channel communication resource allocated to the first communication device using a network-assisted mode control channel communication resource.

8. The first communication device of claim 5, wherein the program further includes instructions for forwarding the information about the first data channel communication resource selected by the second communication device to the base station as part of a request for allocating further communication resources for a communication between the base station and the first communication device.

9. A base station, comprising:
a processor; and
a non-transitory computer-readable storage medium storing a program to be executed by the processor, the program including instructions for:
receiving a communication resource selection message from a first communication device, wherein the base station is configured to communicate with the first communication device, and the first communication device is operated in a network-assisted communication mode, wherein the communication resource selection message includes information about a first data channel communication resource selected by at least one second communication device operated in an ad-hoc communication mode;
allocating a second data channel communication resource to the first communication device, wherein the second data channel communication resource allocated to the first communication device is different than the first data channel communication resource selected by the second communication device;
transmitting a communication resource allocation message to the first communication device including information about the second data channel communication resource allocated to the first communication device; and
sharing the information about the first data channel communication resource selected by the second communication device and the information about the second data channel communication resource allocated to the first communication device with another base station.

10. The base station according to claim 9, wherein the program further includes instructions for:
receiving further communication resource selection messages from further communication devices operated in the network-assisted communication mode, the further communication resource selection messages including information about further data channel communication resources selected by further communication devices operating in the ad-hoc communication mode; and allocating the second data channel communication resource to the first communication device taking into account the further data channel communication resources selected by the further communication devices operating in the ad-hoc communication mode.

11. The base station of claim 9, wherein the program further includes instructions for broadcasting a communication resource setup message, the communication resource setup message including information associated with a plurality of communication resources, the information associated with a plurality of communication resources comprising particular information about a communication resource selection protocol or about ad-hoc mode control channel communication resources.

12. The base station of claim 9, wherein the base station is configured to transmit the communication resource allocation message using a Physical Downlink Control Channel (PDCCH).

* * * * *